(12) United States Patent
Parham et al.

(10) Patent No.: US 8,645,660 B2
(45) Date of Patent: Feb. 4, 2014

(54) AUTOMATIC ALLOCATION OF DATA REPLICAS

(75) Inventors: Jeffrey Bruce Parham, Redmond, WA (US); Bhalchandra Pandit, Redmond, WA (US); Mark Robbin Brown, Seattle, WA (US); Murli Satagopan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 12/635,028

(22) Filed: Dec. 10, 2009

(65) Prior Publication Data

US 2011/0145526 A1    Jun. 16, 2011

(51) Int. Cl.
*G06F 12/02* (2006.01)
*G06F 12/16* (2006.01)

(52) U.S. Cl.
USPC ........... 711/173; 711/170; 711/162; 711/147; 711/E12.001; 711/E12.103; 707/802

(58) Field of Classification Search
None
See application file for complete search history.

(56) References Cited

U.S. PATENT DOCUMENTS

| | | | | |
|---|---|---|---|---|
| 5,475,834 | A * | 12/1995 | Anglin et al. | 711/161 |
| 6,457,105 | B1 * | 9/2002 | Spencer et al. | 711/136 |
| 6,671,688 | B1 | 12/2003 | Nikols | |
| 7,120,690 | B1 | 10/2006 | Krishnan | |
| 7,590,660 | B1 * | 9/2009 | Richards et al. | 1/1 |
| 8,055,702 | B2 * | 11/2011 | Lango et al. | 711/162 |
| 2002/0124082 | A1 | 9/2002 | San Andres | |
| 2002/0124137 | A1 * | 9/2002 | Ulrich et al. | 711/162 |
| 2004/0003086 | A1 | 1/2004 | Parham | |
| 2007/0168336 | A1 | 7/2007 | Ransil | |

OTHER PUBLICATIONS

Author Unknown—Windows Server 2008 Technical Overview—Published Date: Jan. 2008 http://download.microsoft.com/download/7/8/d/78d2768f-640a-4e14-a3f8-10835afb0533/Windows%20Server%202008%20Technical%20Overview%20-%20Final.docx.
Author Unknown—Developing a Messaging Architecture—Published Date: 2004 http://docs.sun.com/source/817-6440/architecture.html.
Author Unknown—Active Directory Technical Overview—Published Date: Jul. 2002 http://www.umt.edu/middleware/references/ADtechover.doc.
Author Unknown—Active Directory Lightweight Directory Services—Retrieved Date: Oct. 12, 2009 http://www.milesconsultingcorp.com/Active_Directory_Lightweight_Directory_Services_Experts.ASPX.

* cited by examiner

*Primary Examiner* — Michael Krofcheck
(74) *Attorney, Agent, or Firm* — Workman Nydegger (57) ABSTRACT

Embodiments described herein are directed to providing scalability to software applications. A computer system partitions a portion of data stored in a directory services system into multiple different data partitions. Each data partition includes a primary writable copy and at least one secondary read-only copy of the data. The computer system receives a client request for a portion of the data that is stored in the directory services system and accesses various stored partition mappings to determine which of the different data partitions includes the requested data. The computer system also accesses a dynamic copy locator to determine which of the read-only copies of the indicated partition to access and provide the accessed primary writeable copy of the indicated partition and the determined read-only copy to the client in a virtualized manner so that the client is not aware of the data partitions.

7 Claims, 7 Drawing Sheets

AUTOMATIC ALLOCATION OF DATA REPLICAS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, directory services systems may be used to provide access to information sought by a user or other software application. In some cases, software applications are designed with scalability in mind. Such applications allow virtually any number of users to use the application, provided the application has proper network and computing support. Other applications, however, were not designed with such scalability in mind.

BRIEF SUMMARY

Embodiments described herein are directed to providing scalability to software applications. In one embodiment, a computer system provides cloud scale directory services to a plurality of clients. The computer system partitions at least a portion of data stored in a directory services system into multiple different data partitions. Each data partition includes a primary writable copy and at least one secondary read-only copy of the data. The computer system receives a client request for a portion of the data that is stored in the directory services system and accesses various stored partition mappings to determine which of the different data partitions includes the requested data. The computer system accesses a dynamic copy locator to determine which of the read-only copies of the indicated partition to access. The computer system also provides the accessed primary writeable copy of the indicated partition and the determined read-only copy to the client in a virtualized manner so that the client is not aware of the data partitions.

In another embodiment, a computer system initiates a single master storage system for use with a multi-master directory services store so that, within the single master storage system, all changes to a portion of data are made to a single copy, where each data partition includes a primary writable copy and at least one secondary read-only copy of the data. A single master storage system user is separately connected to the primary copy and to the secondary copy. The computer system receives changes that are to be made to a portion of data stored in a partition of the directory services store and applies the changes to the primary, writable copy of the partition. The computer system also promptly and automatically replicates the changes made to the primary writable copy to the secondary read-only copy to which the single master storage system user is directly connected.

In another embodiment, a computer system allocates copies to clients in a scalable and efficient manner. The computer system receives multiple requests from various different clients for data portions stored in a directory services store. The data portions are partitioned into multiple different data partitions, where each data partition includes a primary writable copy and at least one secondary read-only copy of the data. The computer system determines, based on various network, data, directory services or client characteristics, that the secondary read-only copies of the partitioned data are to be dynamically allocated to ensure that the data is efficiently delivered to each of the clients. The computer system also dynamically allocates the secondary data copies to various data partitions to ensure that the data is efficiently delivered to each of the clients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to providing scalability to software applications. In one embodiment, a computer system provides cloud scale directory services to a plurality of clients. The computer system partitions at least a portion of data stored in a directory services system into multiple different data partitions. Each data partition includes a primary writable copy and at least one secondary read-only copy of the data. The computer system receives a client request for a portion of the data that is stored in the directory services system and accesses various stored partition mappings to determine which of the different data partitions includes the requested data. The computer system accesses a dynamic copy locator to determine which of the read-only copies of the indicated partition to access. The computer system also provides the accessed primary writeable copy of the indicated partition and the determined read-only copy to the client in a virtualized manner so that the client is not aware of the data partitions.

In another embodiment, a computer system initiates a single master storage system for use with a multi-master directory services store so that, within the single master storage system, all changes to a portion of data are made to a single copy, where each data partition includes a primary writable copy and at least one secondary read-only copy of the data. A single master storage system user is separately connected to the primary copy and to the secondary copy. The computer system receives changes that are to be made to a portion of data stored in a partition of the directory services store and applies the changes to the primary, writable copy of the partition. The computer system also promptly and automatically replicates the changes made to the primary writable copy to the secondary read-only copy to which the single master storage system user is directly connected.

In another embodiment, a computer system allocates copies to clients in a scalable and efficient manner. The computer system receives multiple requests from various different clients for data portions stored in a directory services store. The data portions are partitioned into multiple different data partitions, where each data partition includes a primary writable copy and at least one secondary read-only copy of the data. The computer system determines, based on various network, data, directory services or client characteristics, that the secondary read-only copies of the partitioned data are to be dynamically allocated to ensure that the data is efficiently delivered to each of the clients. The computer system also dynamically allocates the secondary data copies to various data partitions to ensure that the data is efficiently delivered to each of the clients.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions, computer program products and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
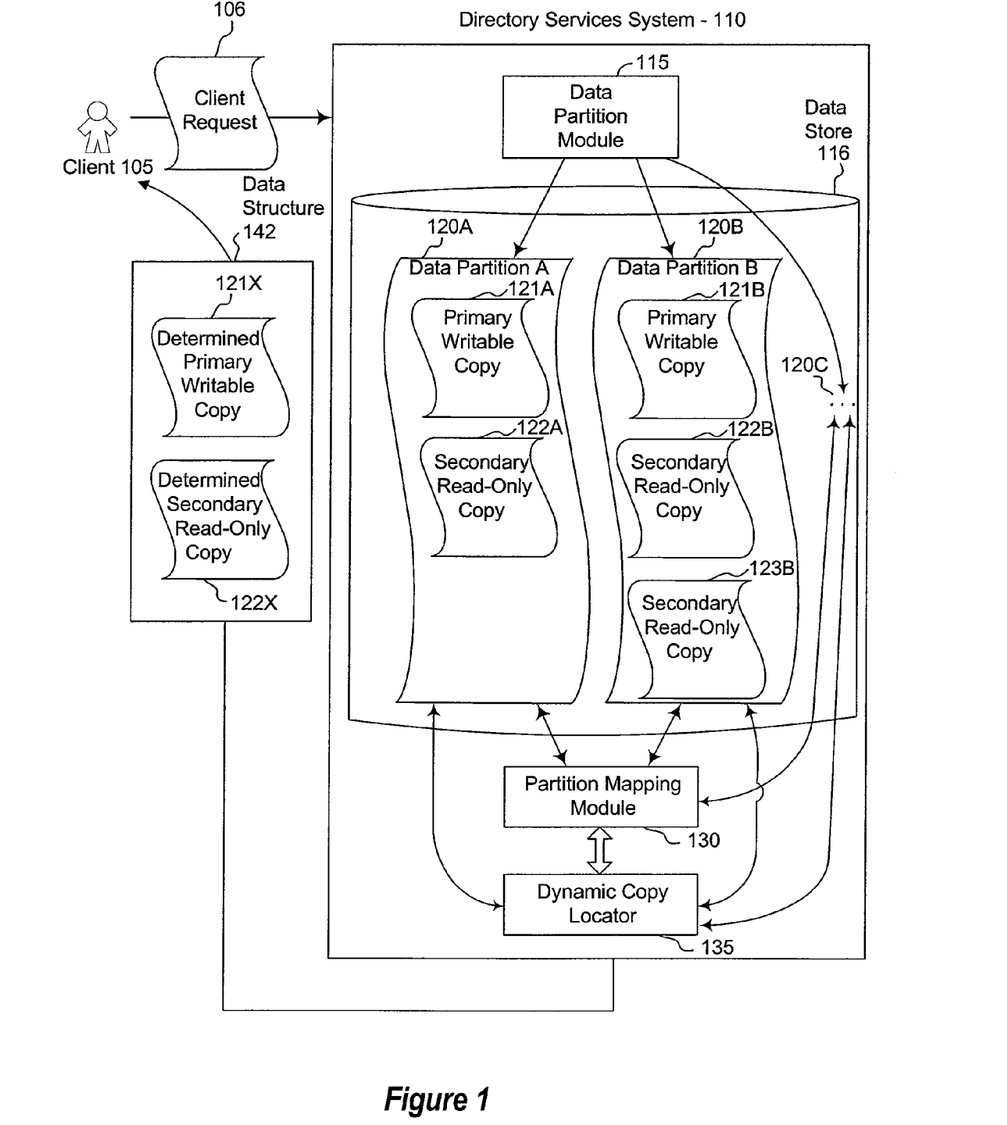
FIG. 1 illustrates a computer architecture in which embodiments of the present invention may operate including providing cloud scale directory services to a plurality of clients.

FIG. 1 illustrates a computer architecture 100 in which the principles of the present invention may be employed. Computer architecture 100 includes directory services system 110. Directory services system (DSS) 110 (or "system 110" herein) may comprise any type of data storage system, database or other data provisioning system. DSS 110 may be configured to receive a data request (e.g. 106) from a client (e.g. 105) and provide, modify or otherwise access the data as requested by the client. In some embodiments, DSS 110 may receive data requests from many thousands or millions of clients. Accordingly, system 110 may scaled to match the demand for data. This scaling may occur within a "cloud" or series of interconnected computer servers that are each configured to provide data to clients based on their requests.

Directory services system 110 may be scaled to provide data to substantially any number of users. Such scaling may occur through the use of data partition module 115. Data partition module 115 may be configured to divide or partition data from data store 116 into any number of data partitions. As shown in FIG. 1, a portion of data may be partitioned into data partition A (120A), data partition B (120B) and any number of other partitions as represented by ellipses 120C. Each data partition may include a primary copy and any number of secondary copies, where the primary copy is writable and the secondary copies are read-only. Accordingly, data partition A (120A) may include primary writable copy 121A and secondary read-only copy 122A and data partition B (120B) may include primary writable copy 121B and secondary read-only copies 122B and 123B.

Partition mapping module 130 of directory services system 110 may be configured to maintain mapping information regarding each of the data partitions. For example, partition mapping module 130 may store mapping information indicating which data is stored in each of the partitions created by data partition module 115. Thus, partition mapping module 130 may be queried to determine which information is stored in any given partition or, alternatively, module 130 may be queried to determine which data partition is storing a requested piece of information. Moreover, the partition mapping module may itself be stored in a partition with its own primary writable copy and other secondary read-only copies. Thus, at least in some cases, the partition mapping module may itself be partitioned to accommodate a very large number of clients.

After determining which data partition is storing the requested information, dynamic copy locator 135 can be used to determine which secondary copy is storing the requested information. As each data partition may include substantially any number of secondary read-only copies, a dynamic copy locator may be implemented to determine which copy or copies actually hold the desired information. Thus, dynamic copy locator 135 may also maintain mappings or other metadata indicating what information each secondary copy is currently storing. Once the correct data partition and secondary copies have been determined, DSS 110 may send an indication of the primary writable copy 121X and determined secondary read-only copy (or copies) 122X that are currently being used to store the information requested by the client. These indications may be packaged or stored in a data structure (e.g. 142) which is designed to hide some or all of the partitioning details from the client. This process will be explained in greater detail below with regard to method 200 of FIG. 2.

Figure 2:
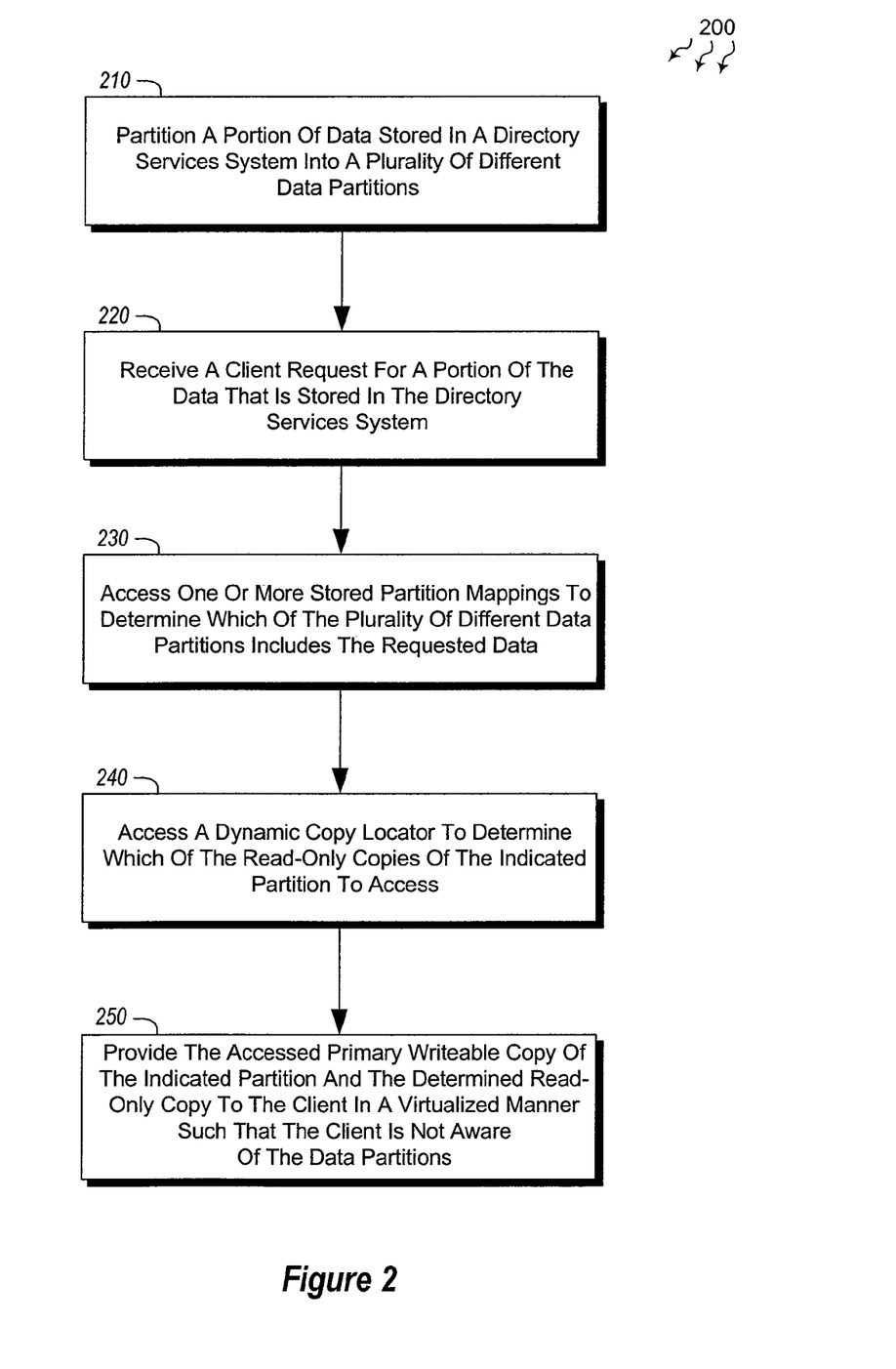
FIG. 2 illustrates a flowchart of an example method for providing cloud scale directory services to a plurality of clients.
Figure 4:
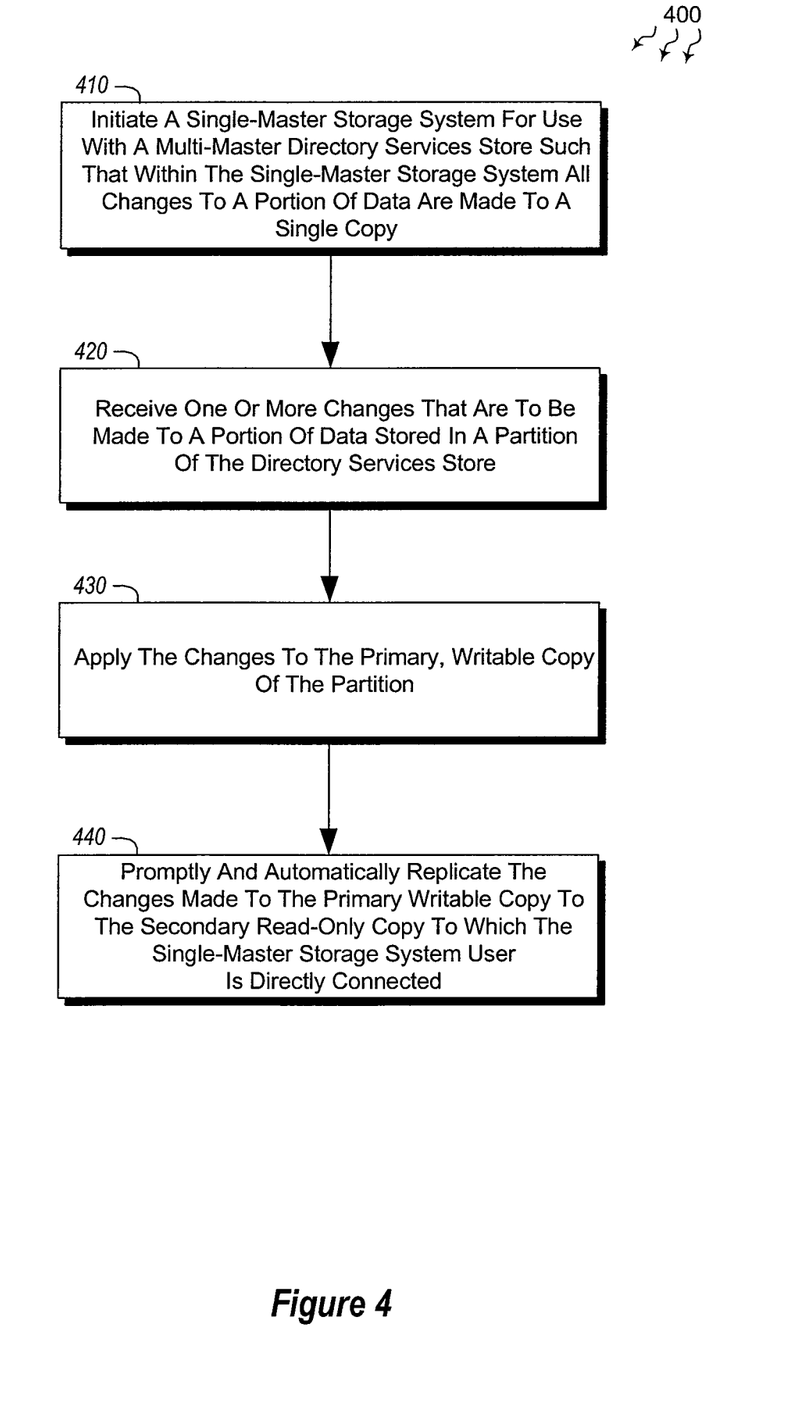
FIG. 4 illustrates a flowchart of an example method for implementing a single master model on top of a multi-master store.
Figure 6:
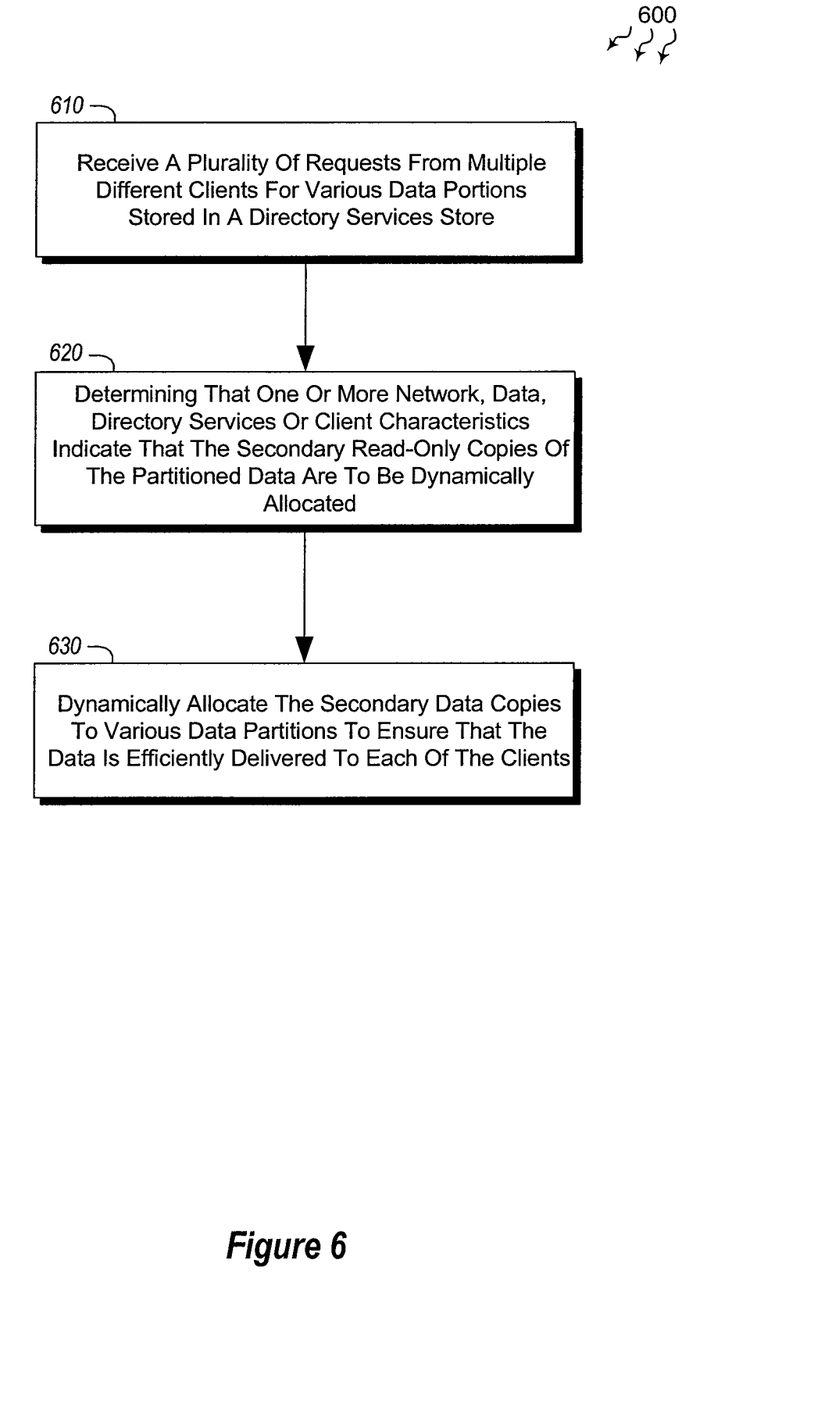
FIG. 6 illustrates a flowchart of an example method for allocating replicas to clients in a scalable and efficient manner.

In view of the systems and architectures described above, methodologies that may be implemented in accordance with the disclosed subject matter will be better appreciated with reference to the flow charts of FIGS. 2, 4 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing cloud scale data access to a plurality of clients. The method 200 will now be described with frequent reference to the components and data of environment 100.

Method 200 includes an act of partitioning a portion of data stored in a directory services system into a plurality of different data partitions, wherein each data partition includes a primary writable copy and at least one secondary read-only copy of the data, and wherein the directory services system is configured to provide data to a limited number of clients (act 210). For example, data partitioning module 115 may partition a portion of data stored in data store 116 of DSS 110 into data partitions 120A and 120B, where each data partition includes a primary writable copy (121A/121B) and at least one secondary read-only copy (122A/122B/123B). DSS 110 may be limited in the number of clients it can service, either due to a lack of resources or due to its own internal programming. In other words, at least in some cases, DSS 110 may not have been designed to scale to a large number of users. Accordingly, the steps below allow for such scaling, regardless of how the DSS was originally programmed.

Method 200 includes an act of receiving a client request for a portion of the data that is stored in the directory services system (act 220). For example, DSS 110 may receive client request 106 from client 105 requesting a portion of data stored in data store 116. In some cases, the client may be a computer user requesting information from DSS 110. In other cases, the client may be a computer program or application that is requesting the information on behalf of the client or perhaps for another software application.

Method 200 also includes an act of accessing one or more stored partition mappings to determine which of the plurality of different data partitions includes the requested data (act 230). For example, DSS 110 may access various partition mappings stored in partition mapping module 130. Data partitions and/or copies may be created dynamically, on-the-fly while receiving user requests. Similarly, the data partitions and/or copies may be deleted, modified or removed on-the-fly. This creation, modification and deletion may occur dynamically and transparently, without the knowledge of the client. Accordingly, if DSS 110 determines that some portions of data are in higher demand than others, data partition module 115 may be used to dynamically create more partitions and/or more secondary copies of that data. Likewise, if some data portions are in low demand or are not being used at all, data partition module may delete or modify partitions as needed. Thus, DSS 110 may continually modify the data partitions to ensure that the data used most often is being provided by (or is spread across) a sufficient number of data partitions.

Figure 7:
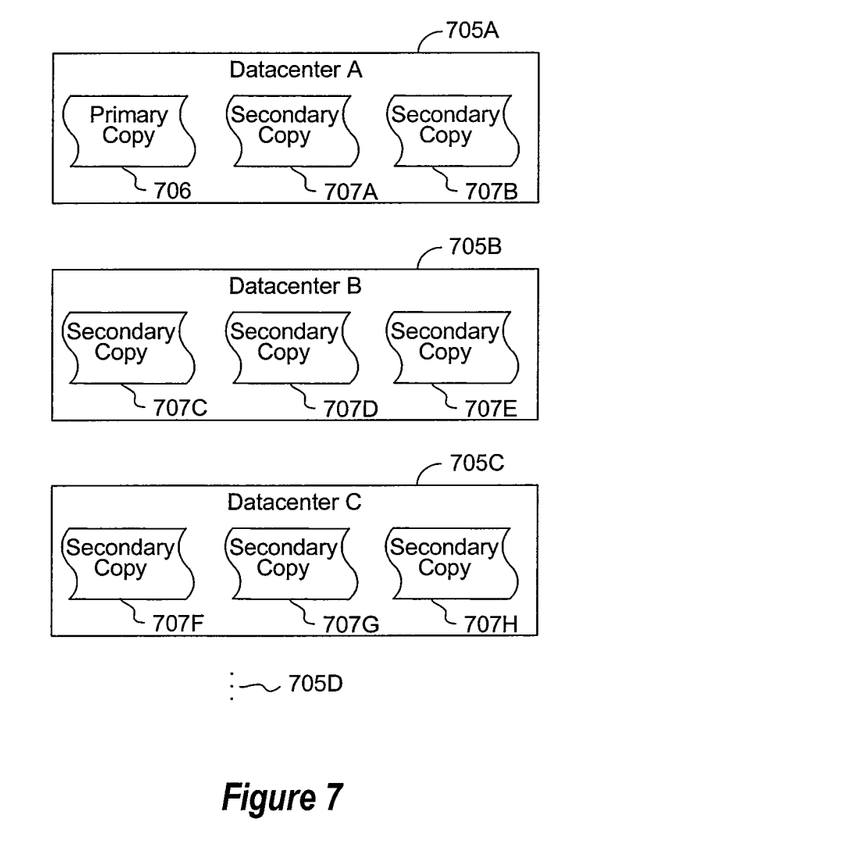
FIG. 7 illustrates an embodiment of the present invention in which multiple datacenters are used to store a partition.

Thus, while the data partitions are being continually updated, the stored partition mappings are also continuously updated to reflect the newly added and removed partitions. In this manner, the partition mapping module 130 is kept continually up to date, so that when a client request is received, partition mapping module can be used to identify where each portion of partitioned data is stored. The partitioned data may be stored in DSS 110 or in other various datacenters. For instance, as shown in FIG. 7, multiple different directory services data centers may be configured to store a single partition with one primary write-only copy and multiple secondary read-only copies. Accordingly, datacenter A (705A) includes primary copy 706 and secondary copies 707A and 707B, while datacenters B (705B) and C (705C) hold secondary copies 707C, 707D, 707E, 707F, 707G and 70711, respectively. Element identifier 705D indicates that many other datacenters may be used. Moreover, while each datacenter is shown holding three data copies, it will be understood that each datacenter may store more or less than three data copies.

Returning to FIG. 2, method 200 includes an act of accessing a dynamic copy locator to determine which of the read-only copies of the indicated partition to access (act 240). For example, DSS 110 may access dynamic copy locator 135 to determine which of the secondary read-only copies of the indicated partition is to be accessed. As mentioned above, a data partition may include any number of secondary copies. Accordingly, once the correct data partition has been identified, the correct secondary copy (or copies) are to be identified. Thus, like partition mapping module 130, dynamic copy locator 135 maintains mappings indicating which secondary copies store certain portions of information. As secondary copies can be deleted, modified or added on-the-fly, dynamic copy locator 135 is kept continually up to date regarding any changes made to copies within the data partitions. Modifying the data copies can lead to an increase in scalability. For instance, read scalability may be increased by adding additional read-only copies while write scalability may be increased by adding additional data partitions.

Method 200 includes an act of providing the accessed primary writeable copy of the indicated partition and the determined read-only copy to the client in a virtualized manner such that the client is not aware of the data partitions (act 250). For example, after the partition mapping module 130 has determined the proper data partition and after dynamic copy locator 135 has determined the proper data copies, the determined primary writable copy 121X and the determined secondary read-only copy are sent to client 105. This is done in a virtualized manner in that the client is unaware of the data partitions. As indicated above, determined primary copy 121X and any determined secondary copies (e.g. 122X) may be housed in data structure 142 which is configured to hide any partitioning details that would indicate how the data is partitioned within data store 116.

Once the client (or the client's software application) knows the location of the data, the client can establish a direct connection to the data store containing the determined data copies. After such a direct connection is established, the client can make changes to the primary writable copy using the established connection, without having to send communications through the partition mapping module 130. Any changes made to the writable copy are then automatically propagated to the secondary read-only copies by the directory services system 110. The client can continue to make changes to and otherwise work with the data of primary writable copy 121X as long he or she desires. After which, the user may close the direct connection. In this manner, users can access any of the data portions stored in data store 116, make changes, and have those changes propagated to the rest of the directory services system.

Figure 3:
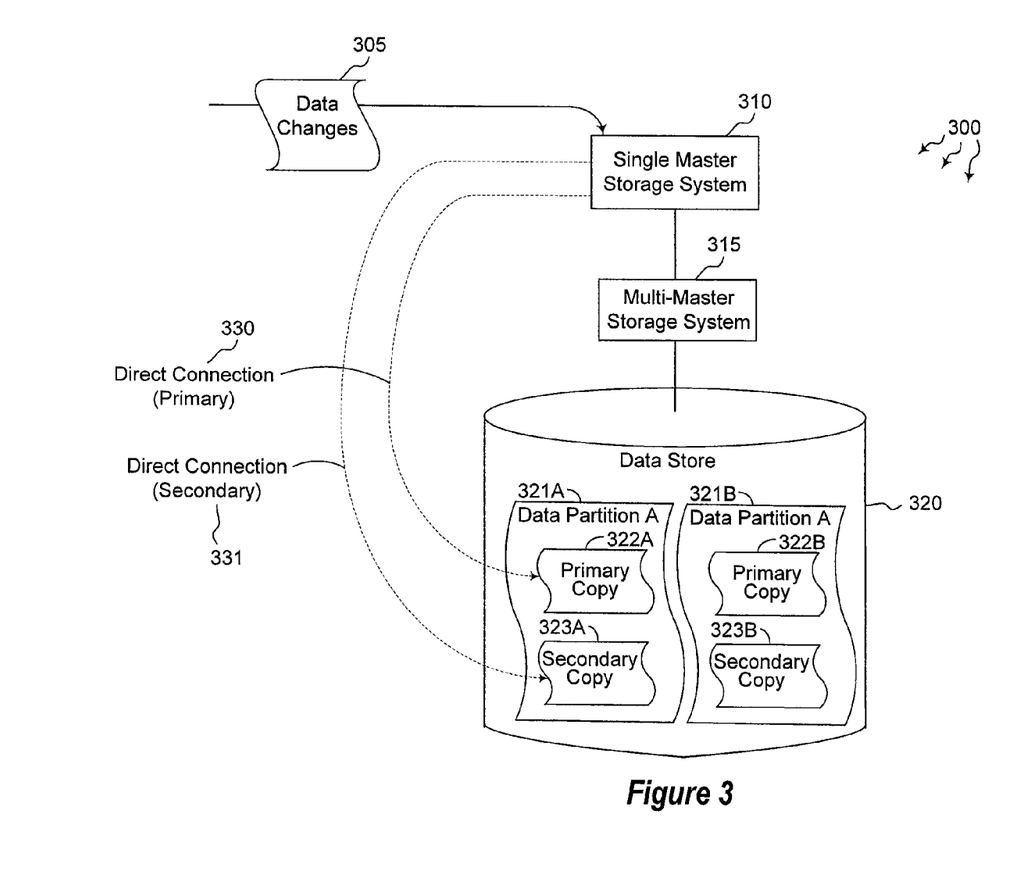
FIG. 3 illustrates a computer architecture in which embodiments of the present invention may operate including implementing a single master model on top of a multi-master store.

Moving now to FIG. 3, FIG. 3 illustrates a computer architecture 300 in which the principles of the present invention may be employed. Computer architecture 300 includes a data store 320 similar to or the same as data store 116 of FIG. 1. Data store 320 may be configured to store data partitions A (321A), B (321B) and others. Each data partition may similarly include a primary copy (322A/322B) and one or more secondary copies (323A/323B). In some cases, a directory services system (e.g. DSS 110) may be a multi-master system where multiple different masters are used to manage data input and output.

For instance, as shown in FIG. 3, a directory services system may include multi-master system 315. Multi-master system 315 may be configured to receive inputs from users and perform the changes to the stored data based on the inputs. When using multi-master storage system 315, each copy may be primary and writable. In some embodiments, a single master storage system 310 may be implemented. Single master storage system 310 may be configured such that all of the client inputs (e.g. data changes 305) that would go to multi-master storage system 315 pass through system 310 first. Single master 310 may also be configured to establish direct connections to the data copies in the data partitions. For example, single master 310 may establish direct connection 330 with primary writable copy 322A and further establish direct connection 331 with secondary write-only copy 323A in data store 320. Single master functionality will be explained in greater detail below with regard to method 400 of FIG. 4.

FIG. 4 illustrates a flowchart of a method 400 for implementing a single master model on top of a multi-master store. The method 400 will now be described with frequent reference to the components and data of environment 300.

Method 400 includes an act of initiate a single master storage system for use with a multi-master directory services store such that within the single master storage system, all changes to a portion of data are made to a single copy, wherein each data partition includes a primary writable copy and at least one secondary read-only copy of the data, and wherein a single master user is separately connected to the primary copy and to the secondary copy (act 410). For example, a computer system may initiate single master storage system 310 for use with a multi-master directory services storage system 315 so that all data changes are made to a single copy (e.g. primary copy 322A). Thus, when a user makes changes to various data, the changes are made to a single primary copy (e.g. 322B). Thereafter, the changes are propagated to other secondary copies of data store 320 using the multi-master storage system 315.

In some embodiments, two or more directory services instances may be arranged in a clustered configuration that shares a single storage area network (SAN) based store to provide data redundancy. Accordingly, data redundancy can be provided in scenarios where a single master is in use. This data redundancy may be further bolstered by implementing a backup datacenter with a clustered replica. The clustered replica may include various data partitions and/or data copies as determined by the user or DSS administrator.

Method 400 includes an act of receiving one or more changes that are to be made to a portion of data stored in a partition of the directory services store (act 420). For example, single master storage system 310 may receive data changes 305 that are to be made to a portion of data (e.g. primary copy 322A) stored in data partition A (321A) of data store 320. These data changes may include any type of data modification including adding, removing, altering or otherwise changing the data of the primary copy.

Method 400 also includes an act of applying the changes to the primary, writable copy of the partition (act 430). For example, single master storage system 310 may apply the data changes to primary, writable copy 322A of data partition A (321A). These changes may be applied via a direct connection 330 established between the single master and the primary copy of the data partition. These changes may then be propagated to secondary copy 323A and any other secondary copies via direct connection 331. As with DSS 110 of FIG. 1, the appropriate data partition and secondary copy may be selected by partition mapping module 130 and dynamic copy locator 135, respectively.

Method 400 includes an act of promptly and automatically replicating the changes made to the primary writable copy to the secondary read-only copy to which the single master storage system user is directly connected (act 440). For example, single master storage system 310 may promptly and automatically replicate any changes made to primary writable copy 322A via direct connection 330 to secondary read-only copy 323A via direct connection 331. These changes may then be further propagated to each of the other secondary read-only copies in the directory services data store 320. In this manner, a single master may be used to receive data changes, establish a direct connection to the proper primary and secondary data copies and propagate the changes to other secondary copies and DSS masters as necessary.

Figure 5:
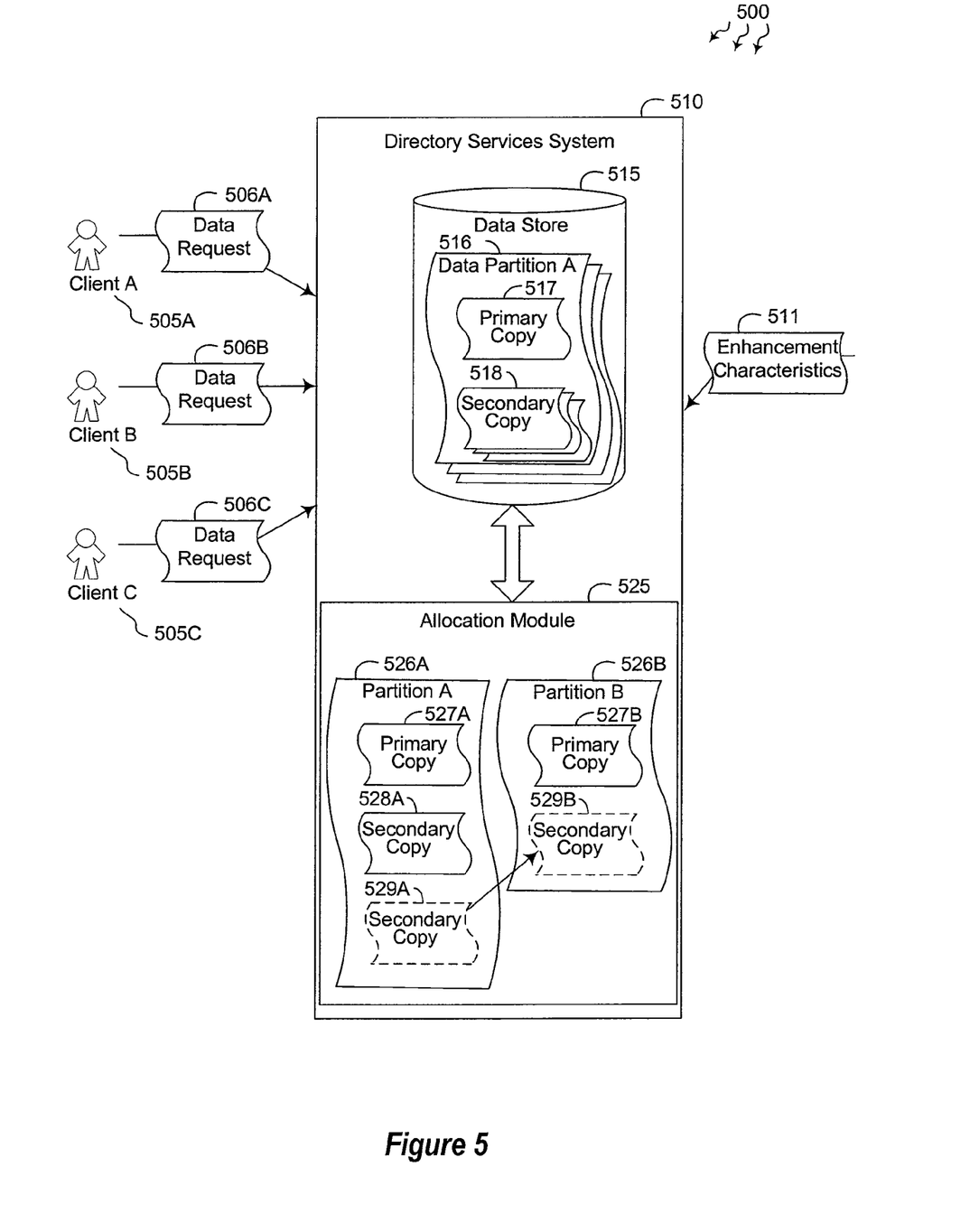
FIG. 5 illustrates a computer architecture in which embodiments of the present invention may operate including allocating replicas to clients in a scalable and efficient manner.

Turning now to FIG. 5, FIG. 5 illustrates a computer architecture 500 in which the principles of the present invention may be employed. Computer architecture 500 includes directory services system (DSS) 510. DSS 510 may be similar to or the same as DSS 110 described above. DSS 510 includes data store 515 which itself includes multiple different data partitions. As depicted in FIG. 5, data store 515 includes data partition A (516) and other partitions not specifically labeled. Data partition A includes a primary writable copy 517 and multiple secondary read-only copies 518.

In some cases, DSS 510 may receive multiple simultaneous requests for data from a plurality of different users. For example, clients A (505A), B (505B) and C (505C) may respectively send data requests 506A, 506B and 506C simultaneously. DSS 510 may then determine which data partitions store the data requested in each of the various data requests. In some cases, as mentioned earlier, DSS 510 may determine that some data copies are being requested more than others. Such a determination may be made by examining the incoming data requests over a period of time.

Using this information, allocation module 525 may reallocate secondary read-only copies to other data partitions. For example, allocation module 525 may determine that secondary copy 529A is not being frequently used and is to be removed from partition A and copied to another partition (e.g. partition B (526B)). Thus, secondary copy 529A may be moved to partition B and become part of that partition (i.e. secondary copy 529B). If allocation module 525 were to determine that secondary copies 528A and 529A were being frequently used, the allocation module would add one or more new secondary copies to partition A, depending on how many were needed to satisfy the demand. This process will be explained in greater detail below with regard to method 600 of FIG. 6.

FIG. 6 illustrates a flowchart of a method 600 for allocating replicas to clients in a scalable and efficient manner. The method 600 will now be described with frequent reference to the components and data of environment 500.

Method 600 includes an act of receiving a plurality of requests from multiple different clients for various data portions stored in a directory services store, wherein the data portions have been partitioned into a plurality of data partitions, each data partition comprising a primary writable copy and at least one secondary read-only copy of the data (act 610). For example, DSS 510 may receive data requests 506A, 506B and 506C from clients 505A, 505B and 505C, respectively, requesting various data portions stored in data store 515. It should be noted that while three clients are shown, each sending one request, each client may send any number of requests and there may be substantially any number of clients sending data requests. Moreover, each data request may be for a different portion of information, or for a different operation including read, write, or both.

Method 600 includes an act of determining that one or more network, data, directory services or client characteristics indicate that the secondary read-only copies of the partitioned data are to be dynamically allocated to ensure that the data is efficiently delivered to each of the clients (act 620). For example, DSS 510 may determine that one or more enhancement characteristics 511 including network, data, directory services or client characteristics may indicate that secondary copies 518 of data partition A (516) are to be dynamically allocated to ensure that the data is efficiently delivered to each client that requested data. Thus, network usage data, data type characteristics, directory services usage information, user/client characteristics and/or any other type of usage information or characteristics may be used to determine when to reallocate the secondary copies and to which data partitions the secondary copies should be reallocated.

Method 600 includes an act of dynamically allocating the secondary data copies to various data partitions to ensure that the data is efficiently delivered to each of the clients (act 630). For example, allocation module 525 may be configured to dynamically allocate secondary copies (e.g. 528A/529A) to various data partitions (e.g. 526A/526B) to ensure that the data is efficiently delivered to each of the clients (505A-C). Thus, as new enhancement characteristics are received, the allocation of secondary copies may be continually reevaluated. If DSS 510 determines that secondary copies are to be reallocated, allocation module 525 can dynamically reallocate those copies while requests are still being received at the directory services system.

These dynamic reallocations may occur automatically and dynamically, without any manual configuration. Secondary copies may be moved to other data partitions as the need arises. Thus, when a new copy is added, the allocation may be automatically adjusted based on the newly deployed copies, without any manual reconfiguration. Similarly, when a copy is no longer available (e.g. down for scheduled maintenance) the allocation may be automatically adjusted. In some cases, special purpose copies may be provided to guarantee a certain quality of service. These special purpose copies may be guaranteed to be available when requested such that the provider of the DSS can provide quality of service guarantees to the client. Such special purpose copies may be available for allocation independent of any other copies.

As mentioned previously, data copies (primary and secondary) can be stored on more than one data store and even in multiple different datacenters. In such cases, locality-awareness may be provided for the client where data copies are dynamically allocated based on which data source is physically located the closest to the client. Thus, for example, if datacenter A (705A) is closest to the user, the data copies would be sent to the client from datacenter A. Additionally or alternatively, the data copies may be dynamically allocated based on which data source has the fastest network connection to the client. Other features such as asynchronous caching may be used during dynamic allocation to ensure that the user is receiving the data in a timely manner. Thus, based on surrounding factors such as data copy usage, network usage and other characteristics, the secondary copies may be continually reallocated to ensure that each partition has a sufficient number of copies to satisfy a given load of client requests.

Accordingly, a directory services system may be provided that scales to allow substantially any number of clients to request and receive data, while hiding the inner workings of the DSS such as partitioning and data copy locating. Data partitions may be managed using a single master system that establishes direct connections to the data copies themselves. Moreover, data copies may be dynamically reallocated to different data partitions in order to ensure the most efficient delivery of data to the client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for allocating data replicas in a scalable and efficient manner, the system comprising the following:

one or more processors;

system memory;

one or more computer-readable storage media having stored thereon computer-executable instructions that, when executed by the one or more processors, causes the computing system to perform a method comprising the following:

an act of receiving a plurality of requests from multiple different clients for various data portions stored in a directory services store, wherein the data portions have been partitioned into a plurality of data partitions, each data partition comprising a primary writable copy and at least one secondary read-only copy of the data;

determining which data copies of the plurality of data partitions are being requested more than other data copies of the plurality of data partitions;

an act of determining that one or more network, data, directory services or client characteristics indicate that the secondary read-only copies of the partitioned data are to be dynamically re-allocated to ensure that the data is efficiently delivered to each of the clients; and based on the frequency of the requests and on the one or more network, data, directory services or client characteristics, an act of dynamically re-allocating the secondary data copies to various data partitions to ensure that the data is efficiently delivered to each of the clients.

2. The system of claim 1, further comprising automatically adjusting the dynamic allocation based on one or more newly deployed copies, without any manual reconfiguration.

3. The system of claim 1, further comprising automatically adjusting the dynamic allocation based on one or more copies that are no longer available without any manual reconfiguration.

4. The system of claim 1, further comprising providing quality of service data delivery assurances by including special purpose copies.

5. The system of claim 4, wherein the special purpose copies are configured for allocation independent of any other copies.

6. The system of claim 1, further comprising providing locality-awareness such that data copies are dynamically allocated based on which data source has the fastest connection to the client.

7. The system of claim 1, further comprising implementing asynchronous caching during dynamic allocation.

\* \* \* \* \*